(12) United States Patent
Thiebaut et al.

(10) Patent No.: US 11,197,343 B2
(45) Date of Patent: Dec. 7, 2021

(54) METHOD AND APPARATUS FOR ADDING NOTIFICATIONS RELATED WITH USER EQUIPMENT MULTICAST GROUP AND LEAVE

(71) Applicant: NOKIA TECHNOLOGIES OY, Espoo (FI)

(72) Inventors: Laurent Thiebaut, Antony (FR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/904,212

(22) Filed: Jun. 17, 2020

(65) Prior Publication Data

US 2020/0404739 A1    Dec. 24, 2020

Related U.S. Application Data

(60) Provisional application No. 62/862,759, filed on Jun. 18, 2019.

(51) Int. Cl.
*H04H 20/71* (2008.01)
*G06F 15/16* (2006.01)
(Continued)

(52) U.S. Cl.
CPC ............. *H04W 76/40* (2018.02); *H04W 4/08* (2013.01)

(58) Field of Classification Search
CPC ................................ H04W 76/40; H04W 4/08
(Continued)

(56) References Cited

U.S. PATENT DOCUMENTS

2019/0158408 A1\* 5/2019 Li ..................... H04L 67/104
2020/0163012 A1\* 5/2020 Zhu ..................... H04W 12/08
(Continued)

FOREIGN PATENT DOCUMENTS

WO    WO 2019/091456 A1    5/2019

OTHER PUBLICATIONS

International Search Report and Written Opinion for Patent Cooperation Treaty Application No. PCT/IB2020/055735 dated Oct. 2, 2020, 23 pages.
(Continued)

*Primary Examiner* — Mark G. Pannell
(74) *Attorney, Agent, or Firm* — Alston & Bird LLP

(57) ABSTRACT

Methods, apparatuses and computer program products are described that facilitate sending and receiving notifications related to user equipment being added to or leaving a multicast group or multicast stream in a network. A method can include receiving, from a session controller, a request for reporting when protocol data unit (PDU) sessions are added to/removed from a downlink replication tree associated with an internet protocol multicast flow; determining whether said PDU session has been added to or removed from the downlink replication tree associated with the internet protocol multicast flow; and, in response to said determining, transmitting a message to a session management function indicative of that said PDU session has been added to or removed from said downlink replication tree. The message can include an internet protocol address associated with a source of said added or removed multicast flow and/or the multicast destination of said internet protocol multicast flow.

20 Claims, 10 Drawing Sheets

(51) Int. Cl.
*H04W 76/40* (2018.01)
*H04W 4/08* (2009.01)

(58) Field of Classification Search
USPC .......................................................... 370/312
See application file for complete search history.

(56) References Cited

U.S. PATENT DOCUMENTS

| | | | |
|---|---|---|---|
| 2020/0267513 A1 | 8/2020 | Zhu et al. | |
| 2020/0344576 A1* | 10/2020 | Li | H04W 4/06 |
| 2020/0351980 A1* | 11/2020 | Talebi Fard | H04W 68/00 |
| 2021/0076166 A1* | 3/2021 | Navratil | H04L 67/141 |

OTHER PUBLICATIONS

"3rd Generation Partnership Project; Technical Specification Group Services and System Aspects; System Architecture for the 5G System; Stage 2 (Release 15)" 3GPP TS 23.501, V15.4.0 (Mar. 2019), 235 pages.

Huawei, "Addition of Support of IPTV Leave Procedure", S2-1912500, 3GPP TSG-WG SA2 Meeting #136, (Nov. 2019), 4 pages.

"3rd Generation Partnership Project; Technical Specification Group Core Network and Terminals; Interface Between the Control Plane and the User Plane Nodes; Stage 3 (Release 15)" 3GPP TS 29.244 v15.6.0 (Jun. 2019), 198 pages.

"3rd Generation Partnership Project; Technical Specification Group Services and System Aspects; Policy and Charging Control Framework for the 5G System; Stage 2 (Release 16)" 3GPP TS 23.503 v16.1.0 (Jun. 2019), 99 pages.

"3rd Generation Partnership Project; Technical Specification Group Services and System Aspects; Procedures for the 5G System; Stage 2 (Release 16)" 3GPP TS 23.502 v16.1.1 (Jun. 2019), 495 pages.

"3rd Generation Partnership Project; Technical Specification Group Services and System Aspects; System Architecture for the 5G System; Stage 2 (Release 16)" 3GPP TS 23.501, v16.1.0 (Jun. 2019), 368 pages.

"3rd Generation Partnership Project; Technical Specification Group Services and System Aspects; Wireless and Wireline Convergence Access Support for the 5G System (5GS) (Release 16)" 3GPP TS 23.316, v16.0.0 (Jun. 2019), 63 pages.

RFC 4604—Using Internet Group Management Protocol Version 3 (IGMPv3) and Multicast Listener Discovery Protocol Version 2 (MLDv2) for Source-Specific Multicast [online] [retrieved Sep. 10, 2020]. Retrieved from the Internet: <URL: https://tools.ietf.org/html/rfc4604>. (Aug. 2006), 11 pages.

RFC 2236—Internet Group Management Protocol, Version 2 [online] [retrieved Sep. 10, 2020]. Retrieved from the Internet: <URL: https://tools.ietf.org/html/rfc2236>, (Nov. 1997), 24 pages.

RFC 3376—Internet Group Management Protocol, Version 3 [online] [retrieved Sep. 10, 2020]. Retrieved via the Internet: <URL: https://tools.ietf.org/html/rfc3376>, (Oct. 2002), 53 pages.

* cited by examiner

METHOD AND APPARATUS FOR ADDING NOTIFICATIONS RELATED WITH USER EQUIPMENT MULTICAST GROUP AND LEAVE

CROSS-REFERENCE TO RELATED APPLICATIONS

This application claims priority to, and the benefit of, U.S. Provisional Patent Application No. 62/862,759, filed Jun. 18, 2019, entitled "Method And Apparatus For Adding Notifications Related With User Equipment Multicast Group And Leave," the entire disclosures of each of which are hereby incorporated herein by reference in their entireties for all purposes.

BACKGROUND

Third generation partnership project (3GPP) 5$^{th}$ generation (5G) technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In general, a 5G network can provide data connectivity and services for internet protocol services, such as streaming television and provision of other streaming media to user devices. In some embodiments, such service provision can be provided via either roaming or non-roaming scenarios, including interworking between 5GS and EPS, mobility within 5GS, QoS, policy control and charging, authentication and in general 5G System wide features e.g. SMS, Location Services, Emergency Services, as described herein. One concept used in 5G mobile networks, which is being defined in 3GPP Release 16 under the Parameters for N4 Session Management and is to be documented, for example but not limited to, in 3GPP technical specification (TS) 23.501, is the concept of supporting internet protocol television (IPTV) services, for instance for a 5G Residential Gateway (5G-RG or FN-RG) served by the 5G Core (5GC) such as an L3 device, and support for various IP PDU Session Types, support for an array of suitable wireless or wireline subscription receiving IP Multicast traffic, and/or support for devices including Residential Gateways but also support for devices other than Residential Gateways.

BRIEF SUMMARY

A method, apparatus, and computer program product are provided in accordance with certain example embodiments in order to facilitate the sending and receiving of notifications between components of the 5G System related to user equipment being added to or leaving a multicast group or multicast stream.

In one example embodiment, a method is provided that comprises receiving, from a session controller, a request for reporting when protocol data unit sessions are added to or removed from a downlink replication tree associated with an internet protocol multicast flow; determining whether a protocol data unit session has been added to or removed from the downlink replication tree associated with the internet protocol multicast flow; and, in response to said determining, transmitting a message to a session management function indicative of that said protocol data unit session has been added to or removed from said downlink replication tree. In some embodiments, the message comprises an internet protocol address associated with a multicast destination of said internet protocol multicast flow. In some embodiments, the message comprises an internet protocol address associated with a source of said added or removed multicast flow and an internet protocol address associated with the multicast destination of said internet protocol multicast flow.

In another example embodiments, a method is provided that comprises causing a user plane function to report when a protocol data unit session has been added to or removed from a downlink replication tree associated with an internet protocol multicast flow; receiving, from the user plane function, a message indicative of that a protocol data unit session has been added to or removed from the downlink replication tree associated with the internet protocol multicast flow, said message comprising at least an internet protocol address associated with a multicast destination of said internet protocol multicast flow; and forwarding the indication that a protocol data unit session has been added to or removed from the downlink replication tree associated with the internet protocol multicast flow to entities that have been requested to be notified of such an event. In some embodiments, causing may comprise causing transmission, to the user plane function, of a request or command that the user plane function reports when a protocol data unit session has been added to or removed from the downlink replication tree associated with the internet protocol multicast flow. In some embodiments, the method can further comprise, in response to receiving said message, determining from among a plurality of internet protocol multicast channels a particular internet protocol multicast channel to which a user equipment is listening.

In yet another example embodiment, a method is provided that comprises receiving a message indicative of that a protocol data unit session has been added to or removed from a downlink replication tree associated with an internet protocol multicast flow, said message comprising at least an internet protocol address associated with a multicast destination of said internet protocol multicast flow; and, in response to receiving said message, determining from among a plurality of internet protocol multicast channels a particular internet protocol multicast channel to which a user equipment is listening and which supports at least one of: storing information related to said particular internet protocol multicast channel in order to generate billing information or statistical information, and controlling one or more times during which a user device may receive said internet protocol multicast flow.

In still another example embodiment, an apparatus is provided that comprises means for receiving, from a session controller, a request for reporting when protocol data unit sessions are added to or removed from a downlink replication tree associated with an internet protocol multicast flow; means for determining whether a protocol data unit session has been added to or removed from the downlink replication tree associated with the internet protocol multicast flow; and means for, in response to said determining, transmitting a message to a session management function indicative of that said protocol data unit session has been added to or removed from said downlink replication tree. In some embodiments, the message may comprise an internet protocol address associated with a multicast destination of said internet protocol multicast flow. In some embodiments, the message may comprise an internet protocol address associated with a source of said added or removed multicast flow and an internet protocol address associated with the multicast destination of said internet protocol multicast flow.

In another example embodiment, an apparatus is provided that comprises means for causing a user plane function to report when a protocol data unit session has been added to or removed from a downlink replication tree associated with an internet protocol multicast flow; means for receiving, from the user plane function, a message indicative of that a protocol data unit session has been added to or removed from the downlink replication tree associated with the internet protocol multicast flow, said message comprising at least an internet protocol address associated with a multicast destination of said internet protocol multicast flow; and means for forwarding the indication that a protocol data unit session has been added to or removed from the downlink replication tree associated with the internet protocol multicast flow to entities that have been requested to be notified of such an event. In some embodiments, means for causing can comprise means for causing transmission, to the user plane function, of a request or command that the user plane function reports when a protocol data unit session has been added to or removed from the downlink replication tree associated with the internet protocol multicast flow. In some embodiments, the apparatus can further comprise means for, in response to receiving said message, determining from among a plurality of internet protocol multicast channels a particular internet protocol multicast channel to which a user equipment is listening.

In yet example embodiment, an apparatus is provided that comprises means for receiving a message indicative of that a protocol data unit session has been added to or removed from a downlink replication tree associated with an internet protocol multicast flow, said message comprising at least an internet protocol address associated with a multicast destination of said internet protocol multicast flow; and means for, in response to receiving said message, determining from among a plurality of internet protocol multicast channels a particular internet protocol multicast channel to which a user equipment is listening and which supports at least one of: storing information related to said particular internet protocol multicast channel in order to generate billing information or statistical information, and controlling one or more times during which a user device may receive said internet protocol multicast flow.

In another example embodiment, an apparatus is provided that comprises at least one processor and at least one memory including computer program code for one or more programs. In some embodiments, the at least one memory and the computer program code can be configured to, with the at least one processor, cause the apparatus at least to: receive, from a session controller, a request for reporting when protocol data unit sessions are added to or removed from a downlink replication tree associated with an internet protocol multicast flow; determine whether a protocol data unit session has been added to or removed from the downlink replication tree associated with the internet protocol multicast flow; and in response to said determining, transmit a message to a session management function indicative of that said protocol data unit session has been added to or removed from said downlink replication tree. In some embodiments, the message can comprise an internet protocol address associated with a multicast destination of said internet protocol multicast flow. In some embodiments, the message can comprise an internet protocol address associated with a source of said added or removed multicast flow and an internet protocol address associated with the multicast destination of said internet protocol multicast flow.

In still another example embodiment, an apparatus is provided that comprises at least one processor and at least one memory including computer program code for one or more programs. In some embodiments, the at least one memory and the computer program code can be configured to, with the at least one processor, cause the apparatus at least to: cause a user plane function to report when a protocol data unit session has been added to or removed from a downlink replication tree associated with an internet protocol multicast flow; receive, from the user plane function, a message indicative of that a protocol data unit session has been added to or removed from the downlink replication tree associated with the internet protocol multicast flow, said message comprising at least an internet protocol address associated with a multicast destination of said internet protocol multicast flow; and forward the indication that a protocol data unit session has been added to or removed from the downlink replication tree associated with the internet protocol multicast flow to entities that have been requested to be notified of such an event. In some embodiments, the at least one memory and the computer program code are configured to, with the at least one processor, cause the apparatus at least to: cause transmission, to the user plane function, of a request or command that the user plane function reports when a protocol data unit session has been added to or removed from the downlink replication tree associated with the internet protocol multicast flow. In some embodiments, the at least one memory and the computer program code are configured to, with the at least one processor, cause the apparatus at least to: in response to receiving said message, determine from among a plurality of internet protocol multicast channels a particular internet protocol multicast channel to which a user equipment is listening.

In yet another example embodiment, an apparatus is provided that comprises at least one processor and at least one memory including computer program code for one or more programs. In some embodiments, the at least one memory and the computer program code can be configured to, with the at least one processor, cause the apparatus at least to: receive a message indicative of that a protocol data unit session has been added to or removed from a downlink replication tree associated with an internet protocol multicast flow, said message comprising at least an internet protocol address associated with a multicast destination of said internet protocol multicast flow; and, in response to receiving said message, determine from among a plurality of internet protocol multicast channels a particular internet protocol multicast channel to which a user equipment is listening and which supports at least one of: storing information related to said particular internet protocol multicast channel in order to generate billing information or statistical information, and controlling one or more times during which a user device may receive said internet protocol multicast flow.

In yet another example embodiment, a computer program product is provided that comprises at least one non-transitory computer-readable storage medium having computer-executable program code instructions stored therein. In some embodiments, the computer-executable program code instructions can comprise program code instructions configured, upon execution, to: receive, from a session controller, a request for reporting when protocol data unit sessions are added to or removed from a downlink replication tree associated with an internet protocol multicast flow; determine whether a protocol data unit session has been added to or removed from the downlink replication tree associated with the internet protocol multicast flow; and, in response to said determining, transmit a message to a session management function indicative of that said protocol data unit session has been added to or removed from said downlink replication tree. In some embodiments, the message may comprise an internet protocol address associated with a multicast destination of said internet protocol multicast flow. In some embodiments, the message may comprise an internet protocol address associated with a source of said added or removed multicast flow and an internet protocol address associated with the multicast destination of said internet protocol multicast flow.

In another example embodiment, a computer program product is provided that comprises at least one non-transitory computer-readable storage medium having computer-executable program code instructions stored therein. In some embodiments, the computer-executable program code instructions can comprise program code instructions configured, upon execution, to: cause a user plane function to report when a protocol data unit session has been added to or removed from a downlink replication tree associated with an internet protocol multicast flow; receive, from the user plane function, a message indicative of that a protocol data unit session has been added to or removed from the downlink replication tree associated with the internet protocol multicast flow, said message comprising at least an internet protocol address associated with a multicast destination of said internet protocol multicast flow; and forward the indication that a protocol data unit session has been added to or removed from the downlink replication tree associated with the internet protocol multicast flow to entities that have been requested to be notified of such an event. In some embodiments, the program code instructions are further configured, upon execution, to: cause transmission, to the user plane function, of a request or command that the user plane function reports when a protocol data unit session has been added to or removed from the downlink replication tree associated with the internet protocol multicast flow. In some embodiments, the program code instructions can be further configured, upon execution, to, in response to receiving said message, determine from among a plurality of internet protocol multicast channels a particular internet protocol multicast channel to which a user equipment is listening.

In still another example embodiment, a computer program product is provided that comprises at least one non-transitory computer-readable storage medium having computer-executable program code instructions stored therein. In some embodiments, the computer-executable program code instructions can comprise program code instructions configured, upon execution, to: receive a message indicative of that a protocol data unit session has been added to or removed from a downlink replication tree associated with an internet protocol multicast flow, said message comprising at least an internet protocol address associated with a multicast destination of said internet protocol multicast flow; and, in response to receiving said message, determine from among a plurality of internet protocol multicast channels a particular internet protocol multicast channel to which a user equipment is listening and which supports at least one of: storing information related to said particular internet protocol multicast channel in order to generate billing information or statistical information, and controlling one or more times during which a user device may receive said internet protocol multicast flow.

BRIEF DESCRIPTION OF THE DRAWINGS

Figure 1:
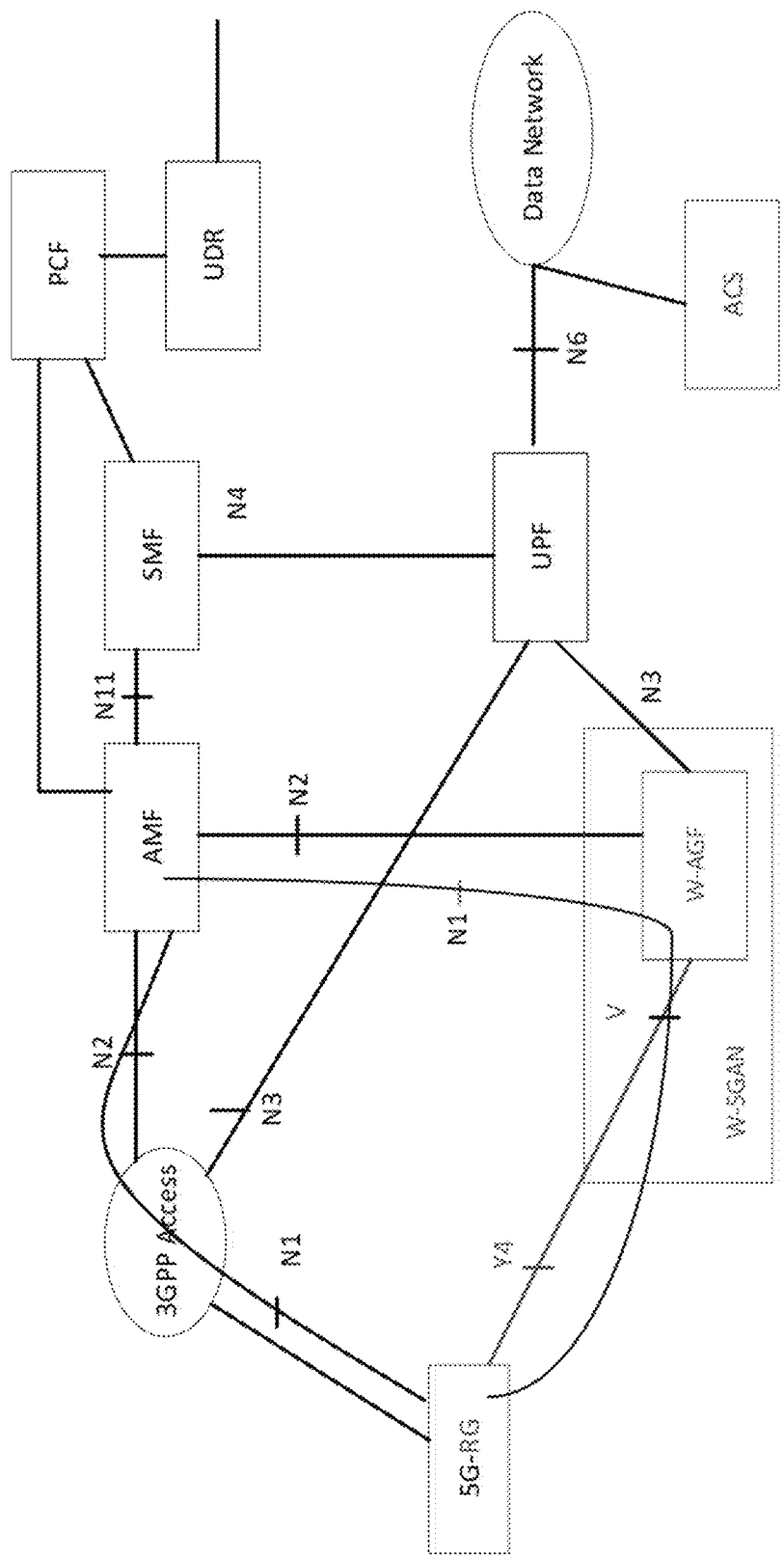
Figure 2:
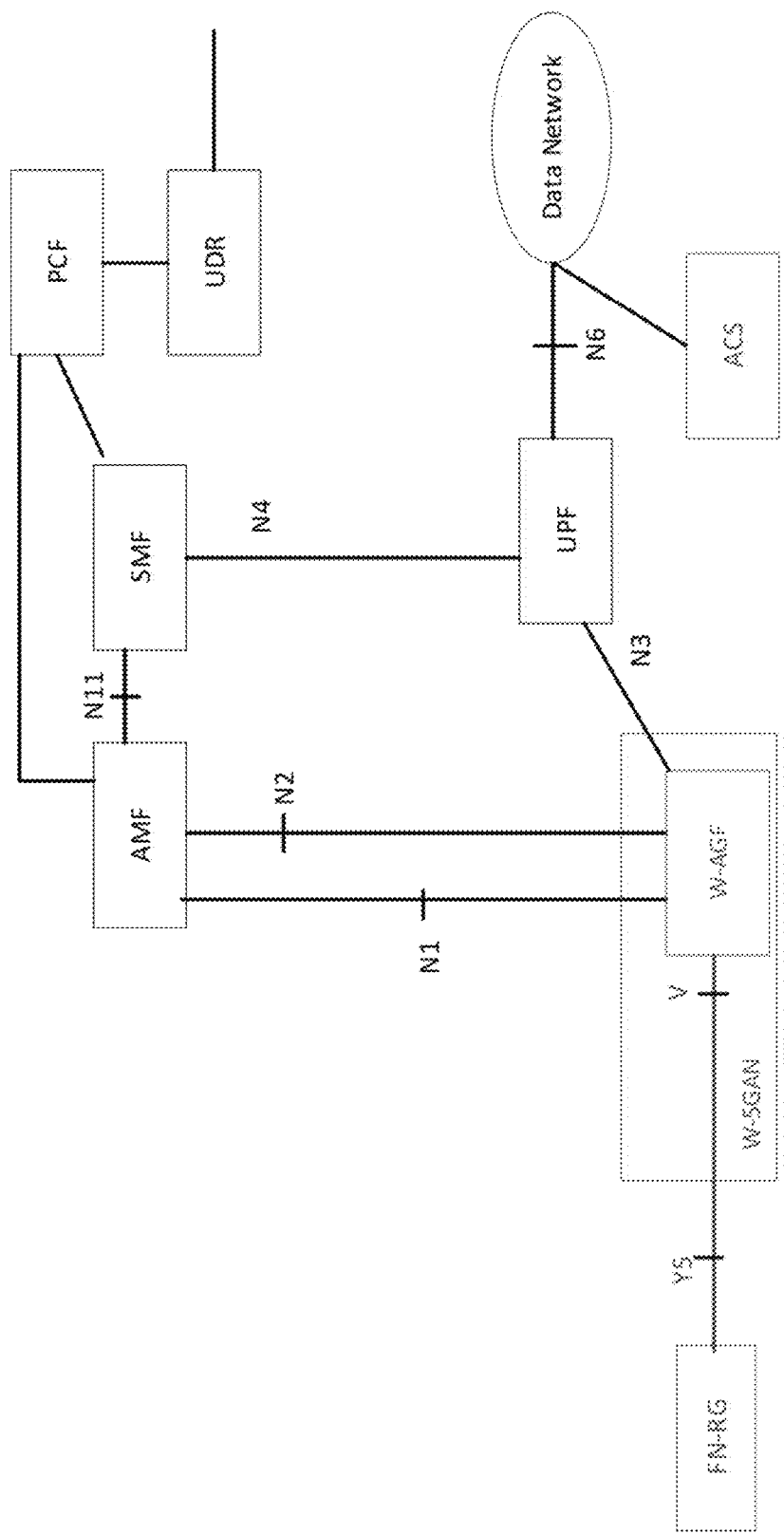
Figure 3:
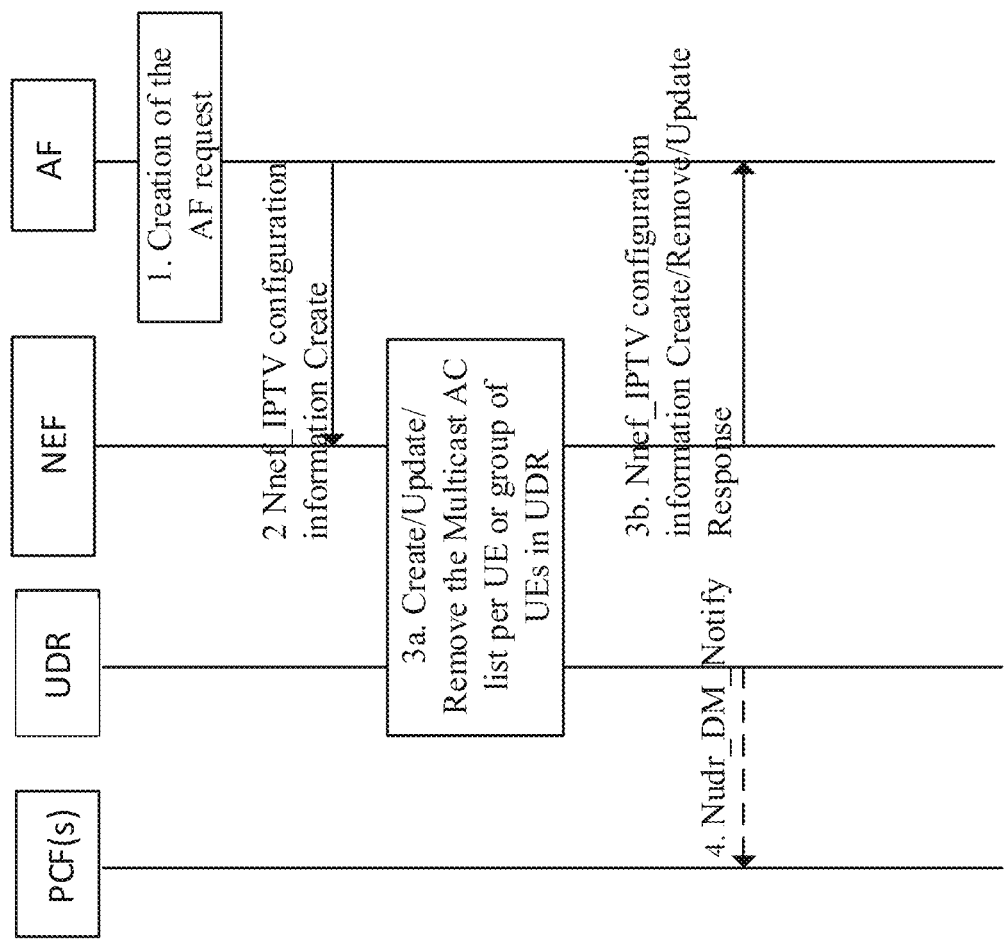
Figure 4:
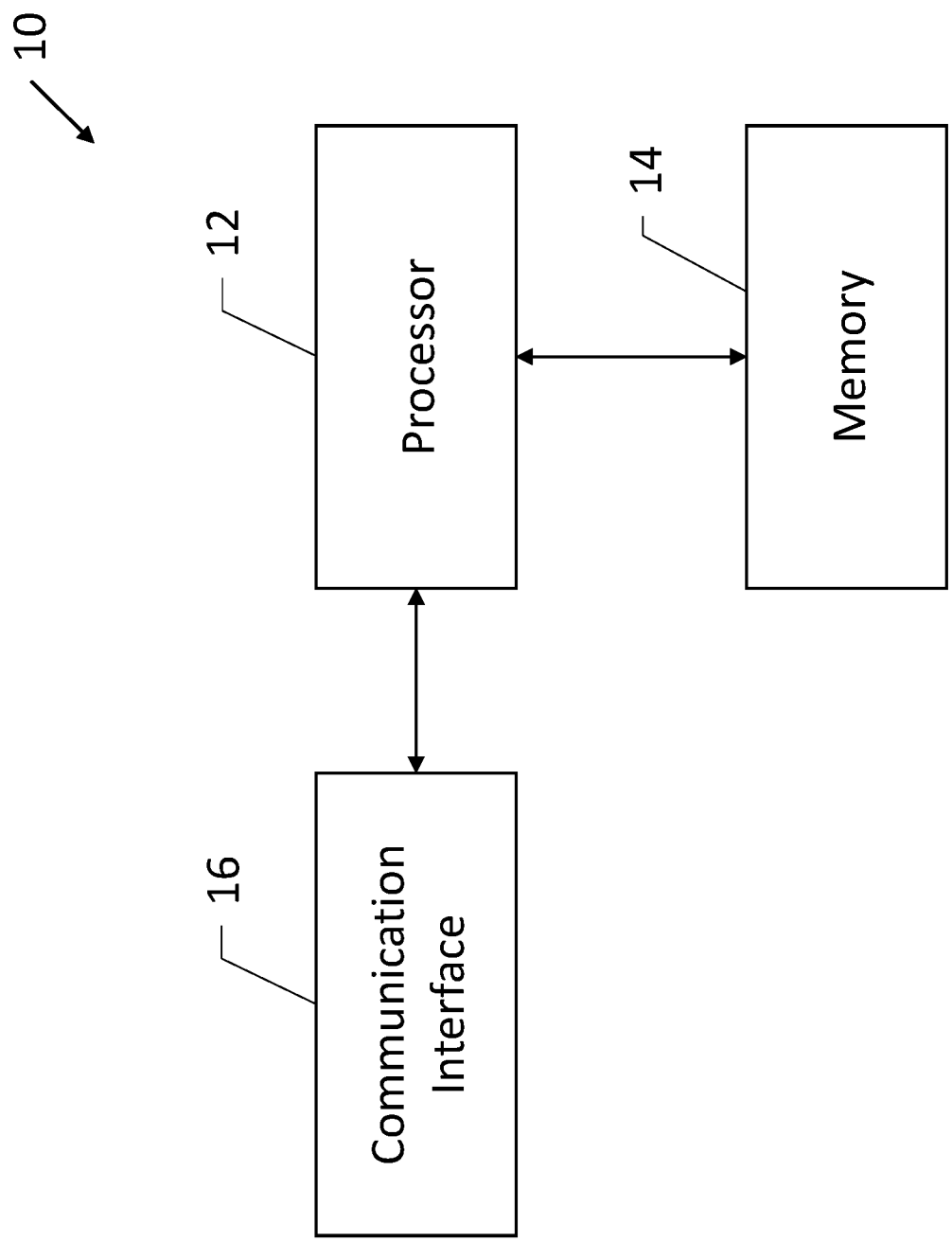
Figure 5:
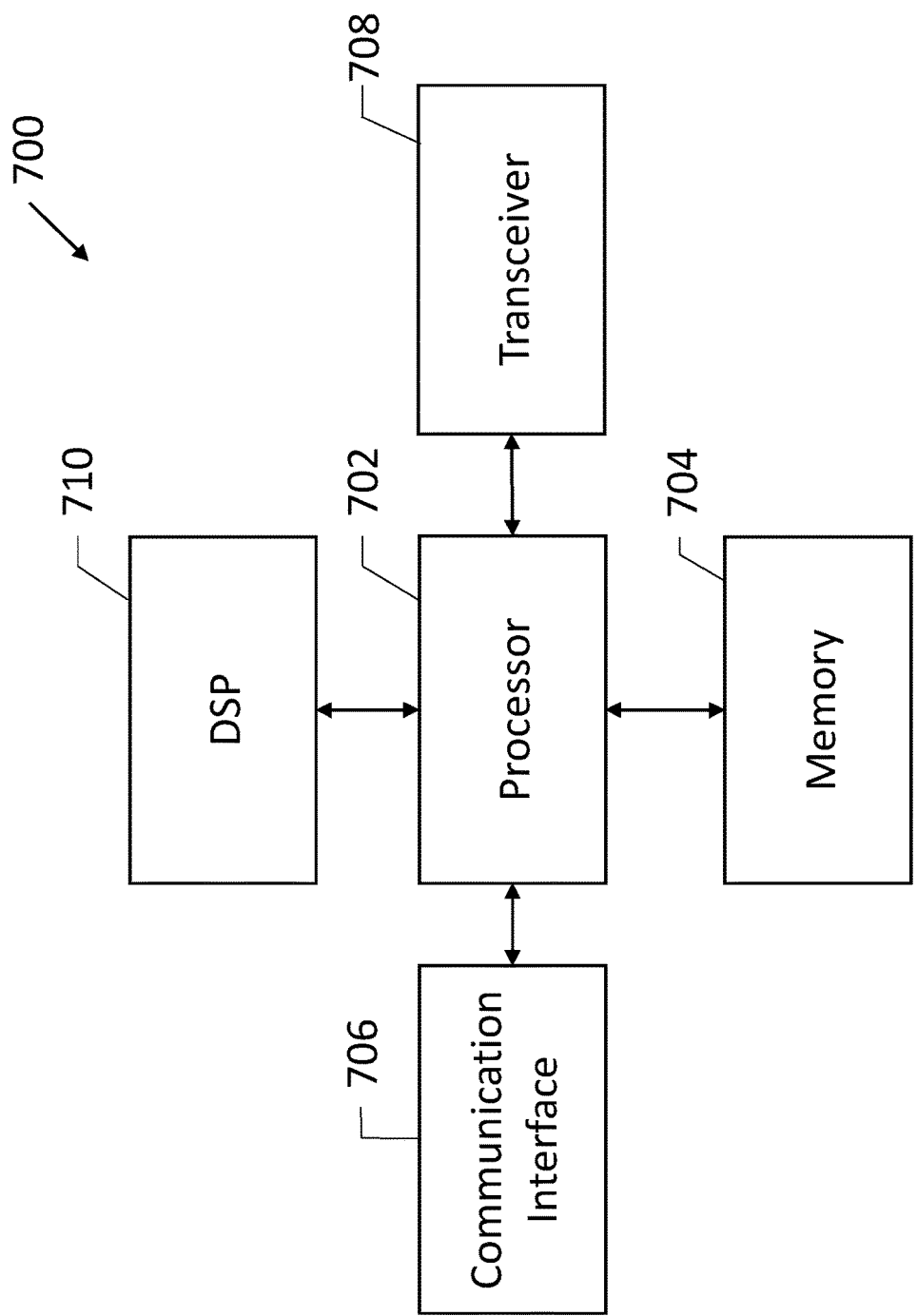
Figure 6:
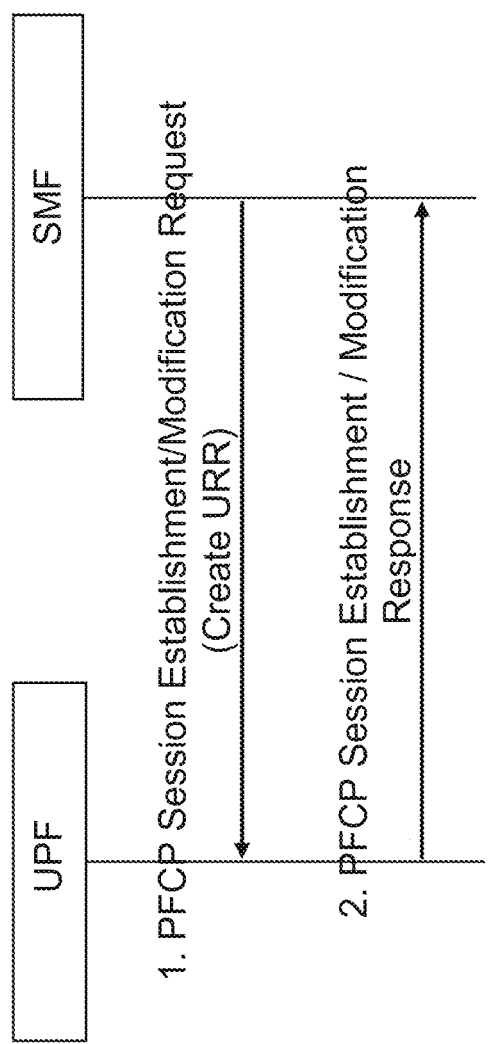
Figure 7:
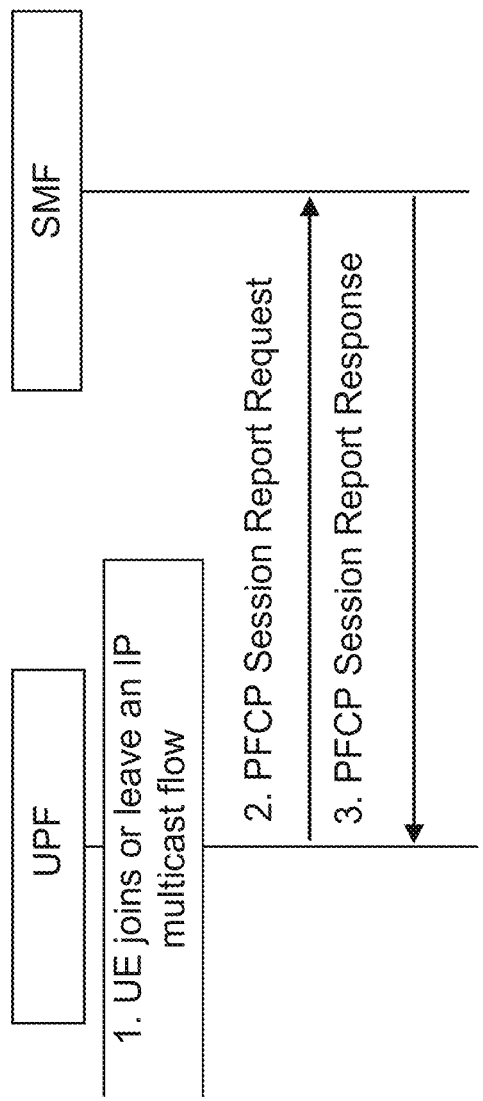
Figure 8:
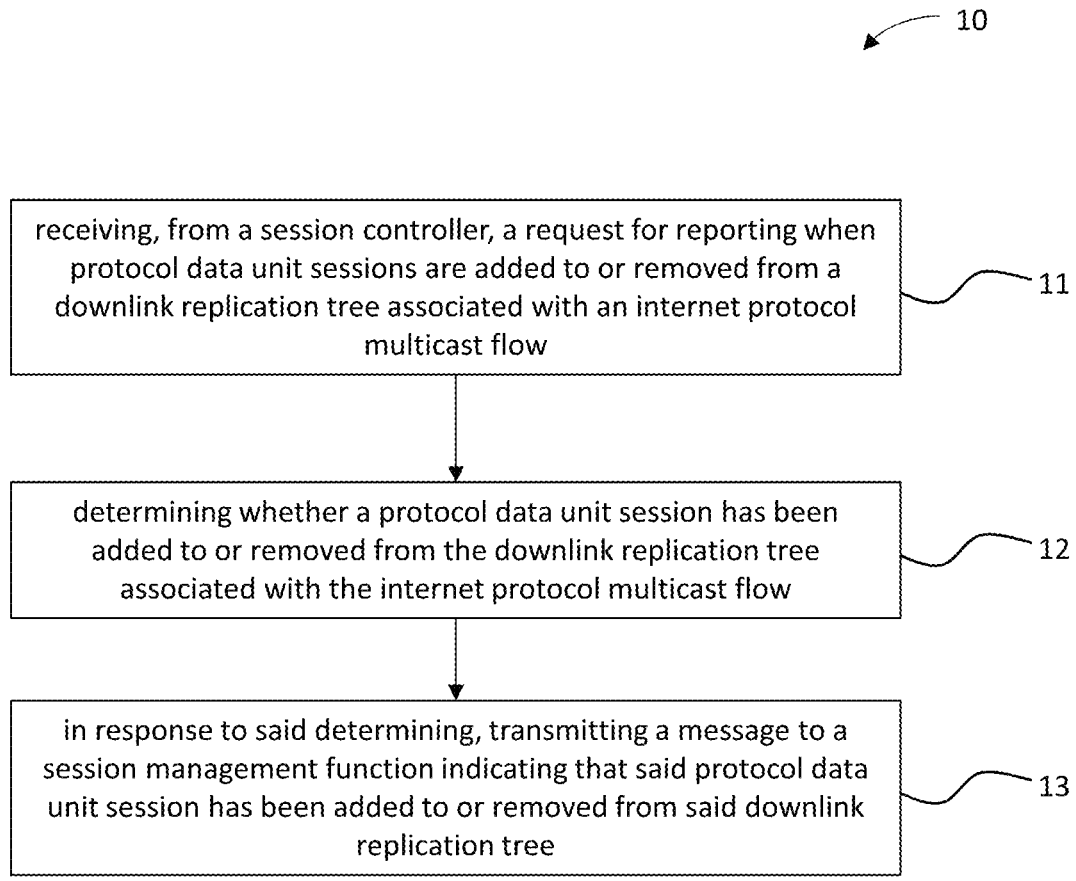
Figure 9:
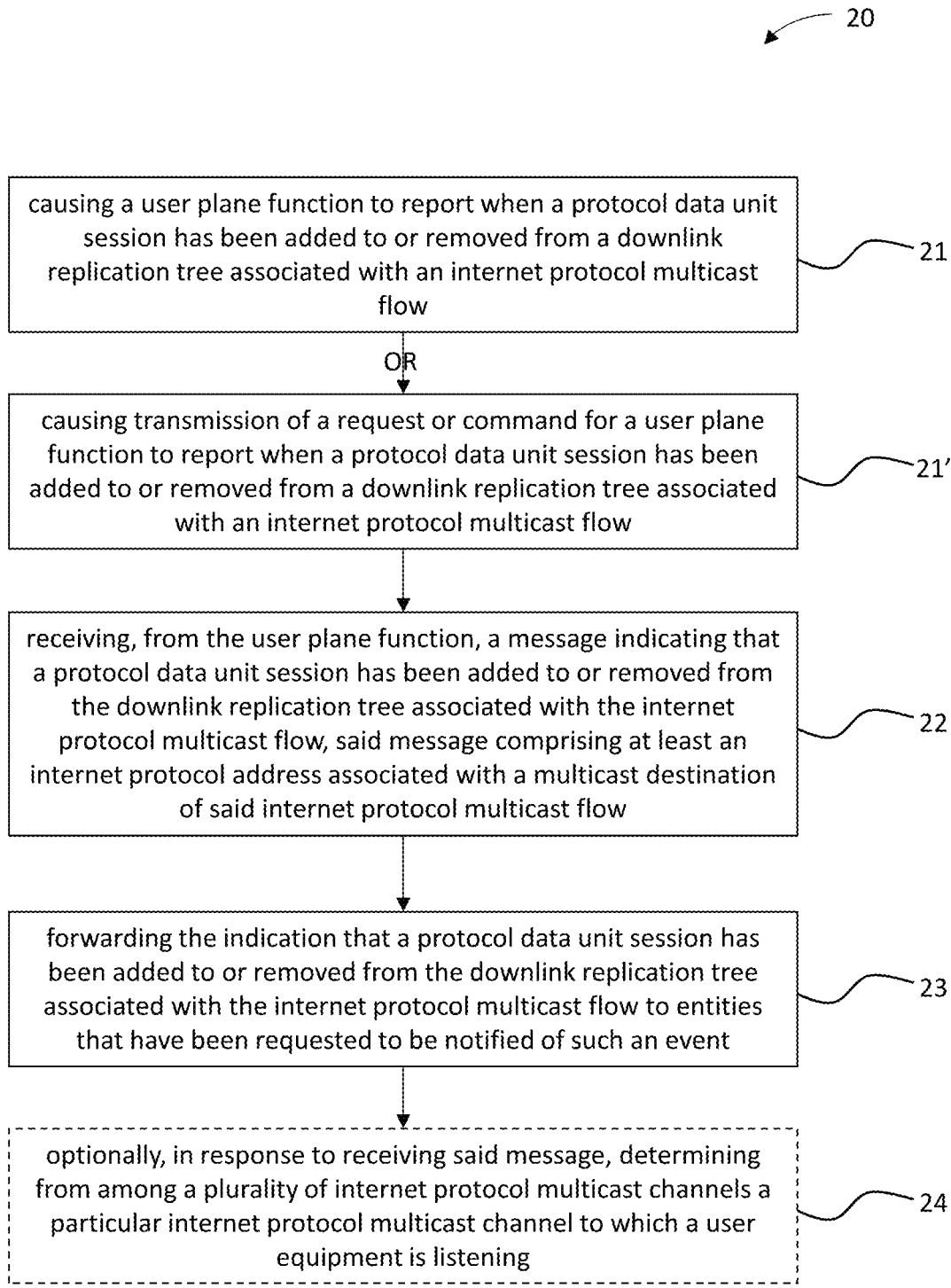
Figure 10:
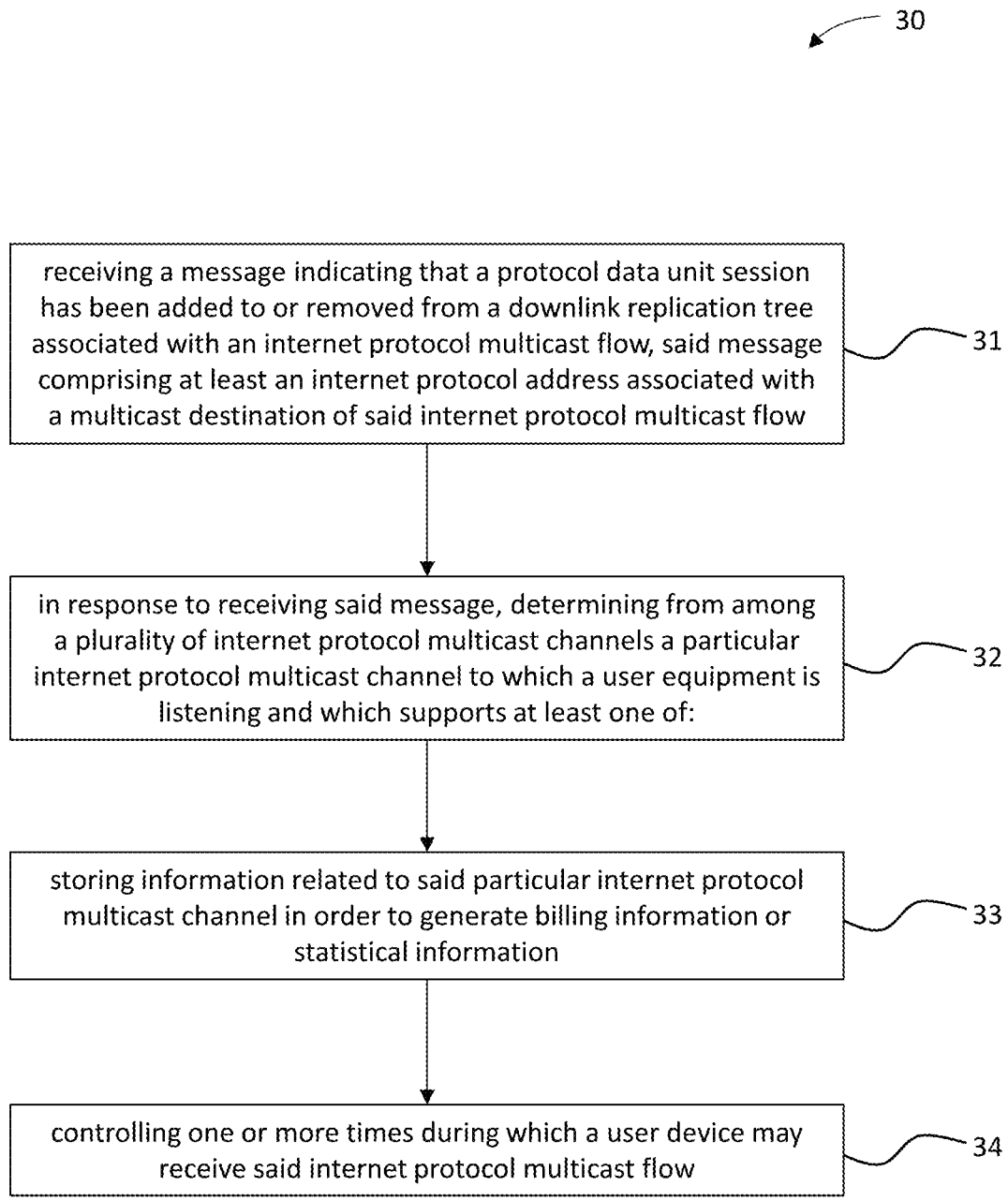

Having thus described certain example embodiments of the invention in general terms, reference will now be made to the accompanying drawings, which are not necessarily drawn to scale, and wherein:

FIG. 1 illustrates an example of a system architecture for 5G-RG using a 5G access network and/or NG Radio Access Network (RAN) to access the 5GC, in accordance with an example embodiment of the present disclosure;

FIG. 2 illustrates an example of a system architecture for 5G Core Network access of an FN-RG, in accordance with an example embodiment of the present disclosure;

FIG. 3 is a diagram of an example IPTV service stream request and notification approach, in accordance with an example embodiment of the present disclosure;

FIG. 4 is a schematic of an example apparatus for adding or retrieving notifications related to user equipment adding or leaving a multicast, in accordance with an example embodiment of the present disclosure;

FIG. 5 is a schematic of an example apparatus for adding or retrieving notifications related to user equipment adding or leaving a multicast, in accordance with an example embodiment of the present disclosure;

FIG. 6 illustrates an example approach for sending a Create Usage Reporting Rule message to a User Plane Function within a PFCP Session, in accordance with an example embodiment of the present disclosure;

FIG. 7 illustrates an example approach for notifying a Session Management Function that a User Equipment has joined or left an IP Multicast Flow using a Reporting Trigger, in accordance with an example embodiment of the present disclosure;

FIG. 8 is a block diagram of an example method for reporting a PDU Session has been added to or removed from a IP Multicast Flow, in accordance with an example embodiment of the present disclosure;

FIG. 9 is a block diagram of an example method for receiving a notification that a PDU Session has been added to or removed from a IP Multicast Flow and forwarding the notification to one or more other entities in a telecommunications system, in accordance with an example embodiment of the present disclosure; and FIG. 10 is a block diagram of an example method for receiving a notification that a PDU Session has been added to or removed from a IP Multicast Flow and tracking IP Multicast channel viewing based upon IP Multicast Destination of an internet protocol multicast flow, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Under the planned and/or forthcoming 5G system, at least some of the hurdles to implementation and practical application at scale include the complexity of naming and system architecture in the 5G System, the varied array of parameters for L1, the dual connectivity options, base station naming, and the like. In terms of resource and service delivery to user equipment, the appropriate parameters and notifications related to connectivity and streaming content delivery can lead to a wired and/or wireless network that covers a broader scope and more types of entities.

In the context of wireline access to the 3GPP 5G Core (5GC), such as described in 3GPP TS 23.316, Release 16, Residential Gateways (RGs) can be served by the 5GC, some of which can include but are not limited to RGs, 5G Residential Gateways, such as a RG that has been modified for the sake of accessing to 5GC, 5G-RG that acts as a full 3GPP User Equipment that is assumed to terminate 3GPP NAS signaling and to support URSP policy rules sent by the 5GC to User Equipment, a Fixed Network RG (FN-RG) that is un-modified for the sake of accessing the 5GC, a wireline access entity (W-AGF) terminates 3GPP NAS signaling (including the NAS signaling carrying URSP rules) on behalf of unmodified FN-RGs, and the like.

Referring now to FIGS. 1 and 2, the architecture for connecting a 5G-RG and FN-RG is illustrated. In some embodiments, the Y4 and Y5 termination at RG side may correspond to any wireline technology (e.g., DSL, PON, Cable, etc.). As illustrated, the disclosed 5G-RG and FN-RG systems may be operable to support multiple services, such as IPTV. In some embodiments, IPTV can be defined as multimedia services, such as television, video, audio, textual media, graphics, data, combinations thereof, and the like that are delivered over IP-based networks managed to support the required level of QoS/QoE, security, interactivity, and/or reliability. In some embodiments, usage of IP multicast may be an important or essential component of the delivery of IPTV content. In some embodiments, IPTV television channels or the like may be associated with an IP Multicast delivery. In some embodiments, the IPTV service may act as an AF, which can set authorization rights per user or group of users.

In some embodiments, the 5G system architecture may consist of some or all of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The 5G system architecture may further comprise the following network entities: Service Communication Proxy (SCP) and Security Edge Protection Proxy (SEPP).

Moreover, although the foregoing descriptions and the associated drawings describe certain example embodiments in the context of an improved 5G communication system, it should be appreciated that other communication systems may be provided by alternative embodiments without departing from the scope of the appended claims. Although 5G technology and 5G systems are employed herein, they are used in an illustrative and descriptive sense only and not for purposes of limitation.

According to some embodiments, the parameters for N4 session management can be used to monitor and control the functionality of the UPF as well as to inform the SMF about events occurring at the UPF, such as the joining or leaving of a user device from a media content stream. The N4 session management procedures defined in TS 23.502 will use the relevant parameters in the same way for all N4 reference points: the N4 Session Establishment procedure as well as the N4 Session Modification procedure provide the control parameters to the UPF, the N4 Session Release procedure removes all control parameters related to an N4 session, and the N4 Session Level Reporting procedure informs the SMF about events related to the PDU Session that are detected by the UPF.

The parameters over N4 reference point provided from SMF to UPF comprises an N4 Session ID and may also contain (i) Packet Detection Rules (PDR) that contain information to classify traffic (PDU(s)) arriving at the UPF; (ii) Forwarding Action Rules (FAR) that contain information on whether forwarding, dropping or buffering is to be applied to a traffic identified by PDR(s); (iii) Multi-Access Rules (MAR) that contain information on how to handle traffic steering, switching and splitting for a MA PDU Session; (iv) Usage Reporting Rules (URR) contains information that defines how traffic identified by PDR(s) shall be accounted as well as how a certain measurement shall be reported; (v) QoS Enforcement Rules (QER), that contain information related to QoS enforcement of traffic identified by PDR(s); (vi) Trace Requirements.

In some embodiments, the N4 Session ID is assigned by the SMF and uniquely identifies an N4 session. If the UPF indicated support of Trace, the SMF may activate a trace session during a N4 Session Establishment or a N4 Session Modification procedure. In that case it provides Trace Requirements to the UPF. The SMF may deactivate an on-going trace session using a N4 Session Modification procedure. There shall be at most one trace session activated per N4 Session at a time.

For the MA PDU Session, the SMF may add an additional access tunnel information during an N4 Session Modification procedure by updating MAR with addition of an FAR ID which refers to an FAR containing the additional access tunnel information for the MA PDU session for traffic steering in the UPF.

N4 Session Context is identified by an N4 Session ID. An N4 Session Context is generated by SMF and UPF respectively to store the parameters related to an N4 session, including N4 session ID, all PDRs, URRs, QERs and FARs or MARs used for this N4 session.

Table 1 describes the Packet Detection Rule (PDR) containing information required to classify a packet arriving at the UPF. Every PDR is used to detect packets in a certain transmission direction, e.g. UL direction or DL direction.

TABLE 1

| Attribute | | Description | Comment |
|---|---|---|---|
| N4 Session ID | | Identifies the N4 session associated to this PDR. NOTE 5. | |
| Rule ID | | Unique identifier to identify this rule. | |
| Precedence | | Determines the order, in which the detection information of all rules is applied. | |
| Packet Detection Information. NOTE 4. | Source interface | Contains the values "access side", "core side", "SMF", "N6-LAN", "5G VN internal". | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), or from "5G VN internal" (i.e. local switch). |
| | UE IP address | One IPv4 address and/or one IPv6 prefix with prefix length (NOTE 3). | |
| | Network instance (NOTE 1) | Identifies the Network instance associated with the incoming packet. | |
| | CN tunnel info | CN tunnel info on N3, N9 interfaces, i.e. F-TEID. | |
| | Packet Filter Set | Details see clause 5.7.6, TS 23.501. | |
| | Application ID | | |
| | QoS Flow ID | Contains the value of 5QI or non-standardized QFI. | |
| | Ethernet PDU Session Information | Refers to all the (DL) Ethernet packets matching an Ethernet PDU session, as further described in clause 5.6.10.2 and in TS 29.244 [65]. | |
| | Framed Route Information | Refers to Framed Routes defined in clause 5.6.14. | Details like all the combination possibilities on N3, N9 interfaces are left for stage 3 decision. |
| Outer header removal | | Instructs the UP function to remove one or more outer header(s) (e.g. IP + UDP + GTP, IP + possibly UDP, VLAN tag), from the incoming packet. | Any extension header shall be stored for this packet. |
| Forwarding Action Rule ID (NOTE 2) | | The Forwarding Action Rule ID identifies a forwarding action that can or shall be applied. | |
| Multi-Access Rule ID (NOTE 2) | | The Multi-Access Rule ID identifies an action to be applied for handling forwarding for a MA PDU Session. | |
| List of Usage Reporting Rule ID(s) | | Every Usage Reporting Rule ID identifies a measurement action that can or shall be applied. | |
| List of QoS Enforcement Rule ID(s) | | Every QoS Enforcement Rule ID identifies a QoS enforcement action that can or shall be applied. | |

NOTE 1:
Needed e.g. in case: UPF supports multiple DNN with overlapping IP addresses; UPF is connected to other UPF or AN node in different IP domains. UPF "local switch", N6-based forwarding and N19 forwarding is used for different 5G LAN groups.
NOTE 2:
Either a FAR ID or a MAR ID is included, not both.
NOTE 3:
The SMF may provide an indication asking the UPF to allocate one IPv4 address and/or IPv6 prefix. When asking to provide an IPv6 Prefix the SMF provides also an IPv6 prefix length.
NOTE 4:
When in the architecture defined in clause 5.34, a PDR is sent over N16a from SMF to I-SMF, the Packet Detection Information may indicate that the I-SMF is to locally determine CN tunnel info in order to build the N4 PDR sent to the actual UPF controlled by the I-SMF. This is further defined in clause 5.34.6.
NOTE 5:
In the architecture defined in clause 5.34, the rules exchanged between I-SMF and SMF are not associated with a N4 Session ID but are associated with a N16a association.

Table 2 describes the QoS Enforcement Rule (QER) that defines how a packet shall be treated in terms of bit rate limitation and packet marking for QoS purposes. All Packet Detection Rules that refer to the same QER share the same QoS resources, e.g. MFBR.

TABLE 2

| Attribute | Description | Comment |
|---|---|---|
| N4 Session ID | Identifies the N4 session associated to this QER. | |
| Rule ID | Unique identifier to identify this information. | |

TABLE 2-continued

| Attribute | Description | Comment |
|---|---|---|
| QoS Enforcement Rule correlation ID (NOTE 1) | An identity allowing the UP function to correlate multiple Sessions for the same UE and APN. | Is used to correlate QoS Enforcement Rules for APN-AMBR enforcement. |
| Gate status UL/DL | Instructs the UP function to let the flow pass or to block the flow. | Values are: open, close, close after measurement report (for termination action "discard"). |
| Maximum bitrate | The uplink/downlink maximum bitrate to be enforced for the packets. | This field may e.g. contain any one of: APN-AMBR (for a QER that is referenced by all relevant Packet Detection Rules of all PDN Connections to an APN) (NOTE 1). Session-AM BR (for a QER that is referenced by all relevant Packet Detection Rules of the PDU Session) QoS Flow MBR (for a QER that is referenced by all Packet Detection Rules of a QoS Flow) SDF MBR (for a QER that is referenced by the uplink/downlink Packet Detection Rule of a SDF) Bearer MBR (for a QER that is referenced by all relevant Packet Detection Rules of a bearer) (NOTE 1). |
| Guaranteed bitrate | The uplink/downlink guaranteed bitrate authorized for the packets. | This field contains: QoS Flow GBR (for a QER that is referenced by all Packet Detection Rules of a QoS Flow) Bearer GBR (for a QER that is referenced by all relevant Packet Detection Rules of a bearer) (NOTE 1). |
| Averaging window | The time duration over which the Maximum and Guaranteed bitrate shall be calculated. | This is for counting the packets received during the time duration. |
| Down-link flow level marking | Flow level packet marking in the downlink. | For UPF, this is for controlling the setting of the RQI in the encapsulation header as described in clause 5.7.5.3. |
| Packet rate (NOTE 1) | Number of packets per time interval to be enforced. | This field contains any one of: downlink packet rate for Serving PLMN Rate Control (the QER is referenced by all PDRs of the UE belonging to PDN connections using CIoT EPS Optimizations as described in TS 23.401 [26]). uplink/downlink packet rate for APN Rate Control (the QER is referenced by all PDRs of the UE belonging to PDN connections to the same APN using CIoT EPS Optimizations as described in TS 23.401 [26]). |

Note 1:
At least these parameters may be used for interworking with EPC.

Table 3 describes the Usage Reporting Rule (URR) that defines how a packet shall be accounted as well as when and how to report the measurements.

TABLE 3

| Attribute | Description | Comment |
|---|---|---|
| N4 Session ID | Identifies the N4 session associated to this URR | |
| Rule ID | Unique identifier to identify this information. | Used by UPF when reporting usage. |
| Reporting triggers | One or multiple of the events can be activated for the generation and reporting of the usage report. | Applicable events include: Start/stop of traffic detection with/without application instance identifier and deduced SDF filter reporting; Deletion of last PDR for a URR; Periodic measurement threshold reached; Volume/Time/Event measurement threshold reached; Immediate report requested; Measurement of incoming UL traffic; Measurement of discarded DL traffic; MAC address reporting in the UL traffic; unknown destination MAC/IP address. |

TABLE 3-continued

| Attribute | Description | Comment |
|---|---|---|
| Periodic measurement threshold | Defines the point in time for sending a periodic report for this URR (e.g. time of day). | This allows generation of periodic usage report for e.g. offline charging.<br>It can also be used for realizing the Monitoring time of the usage monitoring feature.<br>It can also be used for realizing the Quota-Idle-Timeout, i.e. to enable the CP function to check whether any traffic has passed during this time. |
| Volume measurement threshold | Value in terms of uplink and/or downlink and/or total byte-count when the measurement report is to be generated. | |
| Time measurement threshold | Value in terms of the time duration (e.g. in seconds) when the measurement report is to be generated. | |
| Event measurement threshold | Number of events (identified according to a locally configured policy) after which the measurement report is to be generated. | |
| Inactivity detection time | Defines the period of time after which the time measurement shall stop, if no packets are received. | Timer corresponding to this duration is restarted at the end of each transmitted packet. |
| Event based reporting | Points to a locally configured policy which is identifies event(s) trigger for generating usage report. | |
| Linked URR ID(s) | Points to one or more other URR ID. | This enables the generation of a combined Usage Report for this and other URRs by triggering their reporting. See clause 5.2.2.4, TS 29.244 [65]. |
| Measurement Method | Indicates the method for measuring the network resources usage, i.e. the data volume, duration, combined volume/duration, or event. | |
| Measurement information | Indicates specific conditions to be applied for measurements | It is used to request:<br>measurement before QoS enforcement, and/or<br>to pause or set to active a measurement as for the Pause of charging described in clause 4.4.4 of TS 23.502 [3], and/or<br>to request reduced reporting for application start/stop events. |

Table 4 describes the Forwarding Action Rule (FAR) that defines how a packet shall be buffered, dropped or forwarded, including packet encapsulation/decapsulation and forwarding destination.

TABLE 4

| Attribute | Description | Comment |
|---|---|---|
| N4 Session ID | Identifies the N4 session associated to this FAR. | NOTE 9. |
| Rule ID | Unique identifier to identify this information. | |
| Action | Identifies the action to apply to the packet | Indicates whether the packet is to be forwarded, duplicated, dropped or buffered.<br>When action indicates forwarding or duplicating, a number of additional attributes are included in the FAR. For buffering action, a Buffer Action Rule is also included. |
| Network instance (NOTE 2) | Identifies the Network instance associated with the outgoing packet (NOTE 1). | NOTE 8. |
| Destination interface (NOTE 3) (NOTE 7) | Contains the values "access side", "core side", "SMF", "N6-LAN", "5G VN internal" or "5G VN N19. | Identifies the interface for outgoing packets towards the access side (i.e. down-link), the core side (i.e. up-link), the SMF, the N6-LAN (i.e. the DN or the local DN), to 5G VN internal (i.e. local switch), or to 5G VN N19 (i.e. N19 interface). |

TABLE 4-continued

| Attribute | Description | Comment |
|---|---|---|
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI) (NOTE 8). Any extension header stored for this packet shall be added. May contain a list of outer headers for forwarding multicast data. This can be used to e.g. support 5G VN group |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | NOTE 8. |
| Forwarding policy (NOTE 3) | Reference to a preconfigured traffic steering policy or http redirection (NOTE 4). | Contains one of the following policies identified by a TSP ID: an N6-LAN steering policy to steer the subscriber's traffic to the appropriate N6 service functions deployed by the operator, or a local N6 steering policy to enable traffic steering in the local access to the DN according to the routing information provided by an AF as described in clause 5.6.7. or a Redirect Destination and values for the forwarding behaviour (always, after measurement report (for termination action "redirect")). |
| Request for Proxying in UPF | Indicates that the UPF shall perform ARP proxying and/or IPv6 Neighbour Solicitation Proxying as specified in clause 5.6.10.2. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |

NOTE 1:
Needed e.g. in case:
UPF supports multiple DNN with overlapping IP addresses;
UPF is connected to other UPF or NG-RAN node in different IP domains;
UPF "local switch" and N19 forwarding is used for different 5G LAN groups.
NOTE 2:
These attributes may be required for FAR action set to forwarding.
NOTE 3:
These attributes may be required for FAR action set to forwarding or duplicating.
NOTE 4:
The TSP ID is preconfigured in the SMF and included in the FAR according to the description in clauses 5.6.7 and 6.1.3.14 of 23.503 for local N6 steering and 6.1.3.14 of 23.503 for N6-LAN steering. The TSP ID action is enforced before the Outer header creation actions.
NOTE 5:
This attribute is present for FAR action set to buffering.
NOTE 6:
The buffering action rule is created by the SMF and associated with the FAR in order to apply a specific buffering behaviour for DL packets requested to be buffered, as described in clause 5.8.3 and clause 5.2.4 in TS 29.244.
NOTE 7:
The use of "5G VN internal" instructs the UPF to send the packet back for another round of ingress processing using the active PDRs pertaining to another N4 session of the same 5G VN group.
NOTE 8:
When in architectures defined in clause 5.34, a FAR is sent over N16a from SMF to I-SMF, the FAR sent by the SMF may indicate that the I-SMF is to locally determine the value of this attribute in order to build the N4 FAR rule sent to the actual UPF controlled by the I-SMF. This is further defined in clause 5.34.6.
NOTE 9:
In the architecture defined in clause 5.34, the rules exchanged between I-SMF and SMF are not associated with a N4 Session ID but are associated with a N16a association.

The UPF sends the usage report to inform the SMF about the measurement of an active URR or about the detection of application traffic of an active Packet Detection Rule. For each URR, the usage report may be generated repeatedly, i.e. as long as any one of the valid event triggers applies. A final usage report is sent for a URR when it is no longer active, i.e. either the URR is removed or all the references to this URR in any of the Packet Detection Rules belonging to the N4 session.

In some embodiments, attributes that can be included in the usage report may include, but are not limited to, one or more of the attributes in Table 5.

TABLE 5

| Attribute | Description | Comment |
| --- | --- | --- |
| N4 Session ID | Uniquely identifies a session. | Identifies the N4 session associated to this Usage Report |
| Rule ID | Uniquely identifies the Packet Detection Rule or Usage Reporting Rule within a session which triggered the report. | Packet Detection Rule is only indicated when Reporting trigger is Detection of 1st DL packet for a QoS Flow or Start/stop of traffic detection. Usage Reporting Rule is indicated for all other Reporting triggers. |
| Reporting trigger | Identifies the trigger for the usage report. | Applicable values are: Detection of 1st DL packet for a QoS Flow; Start/stop of traffic detection with/without application instance identifier and deduced SDF filter reporting; Deletion of last PDR for a URR; Periodic measurement threshold reached; Volume/Time/Event measurement threshold reached; Immediate report requested; Measurement of incoming UL traffic; Measurement of discarded DL traffic; MAC address reporting in the UL traffic; reporting of unknown destination MAC/IP address. |
| Start time | Provides the timestamp, in terms of absolute time, when the collection of the information provided within Usage-Information is started. | Not sent when Reporting trigger is Start/stop of traffic detection. |
| End time | Provides the timestamp, in terms of absolute time, when the information provided within Usage-Information is generated. | Not sent when Reporting trigger is Start/stop of traffic detection. |
| Measurement information | Defines the measured volume/time/events for this URR. | Details refer to TS 29.244 [65]. |

Table 6 describes the Multi-Access Rule (MAR) that includes the association to the two FARs for both 3GPP access and non-3GPP access in the case of supporting ATSSS.

TABLE 6

| Attribute | Description | Comment |
| --- | --- | --- |
| N4 Session ID | Identifies the N4 session associated to this MAR. | |
| Rule ID | Unique identifier to identify this rule. | |
| Steering functionality | Indicates the applicable traffic steering functionality: Values "MPTCP functionality", "ATSSS-LL functionality". | |

TABLE 6-continued

| Attribute | | Description | Comment |
| --- | --- | --- | --- |
| Steering mode | | Values "Active-Standby", "Smallest Delay", "Load Balancing" or "Priority-based". | |
| Per-Access Forwarding Action information (NOTE 1) | Forwarding Action Rule ID | The Forwarding Action Rule ID identifies a forwarding action that has to be applied. | |
| | Weight | Identifies the weight for the FAR in case steering mode is "Load Balancing" | The weights for all FARs need to sum up to 100 |
| | Priority | Values "Active or Standby" or "High or Low" for the FAR | "Active or Standby" for "Active-Standby" steering mode and "High or Low" for |

TABLE 6-continued

| Attribute | Description | Comment |
| --- | --- | --- |
| List of Usage Reporting Rule ID(s) | Every Usage Reporting Rule ID identifies a measurement action that has to be applied, | "Priority-based" steering mode This enables the SMF to request separate usage reports for different FARs (i.e. different accesses) |

NOTE 1:
The Per-Access Forwarding Action information is provided per access type (i.e. 3GPP access or Non-3GPP access).

In some embodiments, the Registration Procedure can be used to register to 5GS and the PDU Session Establishment Procedure is used to establish the PDU Session used for IPTV Service. In some embodiments, the IPTV Access Procedure may, depending on the deployment, be used to access the IPTV network, e.g., completing the IPTV Authentication and IP allocation function. In some embodiments, a Unicast/Multicast Packets transmission procedure may specify how to transmit unicast/multicast packets related with IPTV service over 5GCS.

In some embodiments, a 5G-RG can perform a Registration procedure, such as described in TS 23.502. In some embodiments, the user equipment may be replaced by 5G-RG. In some embodiments, the 5G-RG may perform a PDU Session establishment procedure, such as described in TS 23.502. In some embodiments, the 5G-RG may indicate within the Protocol Configuration Options element that the UE requests to obtain the IPv4 address with DHCPv4. In some embodiments, the 5G-RG may or shall establish the IP-based PDU Session with a specific DNN for IPTV network. In some embodiments, the PCF may or shall provide PCC Rules, e.g., including information related to IPTV Service. In some embodiments, the SMF may send notifications and/or requests to the UPF acting as PSA N4 rules such as PDR, FAR, or the like that relate with allowed IPTV service for the PDU Session; such as the N4 rules further described herein.

In some embodiments, the corresponding PDR may refer to IP Multicast Addressing information related with allowed IPTV services for the PDU Session. In the case Source Specific Multicast is configured to be used on the PDU Session, both IP Multicast address and Source IP address shall be used to identify the TV services allowed on the PDU Session.

In some embodiments, a set of N4 rules may or shall be sent by the SMF for IP Multicast traffic related with an allowed IPTV service may correspond to, for UL traffic (Internet Group Management Protocol; hereinafter "IGMP"), a PDR identifying the IGMP Join together with the corresponding IP Multicast Addressing information, a FAR with an "IP Multicast Router Accept" action, and/or possibly a URR with a Reporting Trigger set to "IGMP reporting".

In some embodiments, for DL traffic, actual IP Multicast traffic may be related to or comprise a PDR identifying the IP Multicast Addressing information, a FAR asking to add outer header=GTP-u tunnel related with the PDU Session, and/or a QER indicating the target QoS Towards the RG. In some embodiments, the interactions between STB and 5G-RG are described in but not limited by Broadband Forum (hereinafter "BBF") specification TR-124, entitled "Functional Requirements for Broadband Residential Gateway Devices," the entire contents of which are hereby incorporated herein by reference in their entirety for all purposes.

In case of IPTV network access control based on the DHCP procedure, 5G-RG is configured to retrieve the IP address for IPTV service via DHCP. The DHCP procedure described in TS 23.501 is carried out. In some embodiments, when the SMF receives the Uplink DHCP message, the SMF may be configured to insert the IPTV access control information as received in subscription data from UDM to the uplink DHCP message, e.g. subscriber ID. In some embodiments, the IPTV access control information such as the subscriber ID can be represented by and/or include a line ID, such as described in Internet Engineering Task Force (IETF) Request For Comments (RFC) 3046 the entire contents of which are hereby incorporated herein by reference in their entirety for all purposes, or any other identifier which can be used to identify the IPTV subscriber. This is based on IPTV deployment and 3GPP doesn't define the IPTV access control information subscriber ID that the SMF copies from subscription data to DHCP signaling.

In some embodiments, the interactions between STB and 5G-RG is going to be specified in BBF TR-124 and not described in further detail herein. In some embodiments, the interactions among the IPTV network is out of 3GPP scope and not described in this procedure.

In some embodiments, a 5GS can support Unicast Service from IPTV network directly.

In order to obtain the multicast service from IPTV network, the Multicast Packets transmission procedure should be performed.

The SMF sends to UPF N4 rules such as PDR, FAR, and/or the like.

1. The 5G-RG send an IGMP Join message via the user plane.

2. When UPF detects the IGMP Join, the UPF may identify the IGMP Join packets based on PDR received over N4 as described in 3GPP TS 23.316, clause 4.6.3 and handle the IGMP Join accordingly based on FAR as described in 3GPP TS 23.316, clause 4.6.4. An example is given as below:

If the IP Multicast Addressing information included in the IGMP Join message is allowed to be accessed via the PDU Session, the UPF shall add the PDU Session to the requested multicast group.

If the IP Multicast Addressing information included in the IGMP Join message is not allowed to be accessed via the PDU Session, the UPF shall drop the IGMP Join message.

The UPF acts as a Multicast Router as defined in IETF RFC 2236: "Internet Group Management Protocol, Version 2 and IETF RFC 3376: "Internet Group Management Protocol, Version 3". This may include following actions:

if the IGMP Join message is the first IGMP request the UPF has received about the target IP multicast traffic (IP Multicast Addressing information): the UPF exchanges N6 signaling such as PIM (Protocol-Independent Multicast) in order to connect to the N6 multicast distribution tree related with this IP multicast traffic; This ensures that the UPF receives the DL multicast traffic.

The IP multicast related signaling protocol used on N6 (e.g. Sparse Mode PIM-SM) to be supported over N6 is defined by local policies on the UPF.

3-4. When the UPF receives multicast packets from multicast server in IPTV network, the UPF select the PDU Session(s) where to transmit the multicast packets based on the multicast group, constructed in step 2.

In some embodiments, the interactions between STB and 5G-RG are specified in BBF TR-124 and are not described in further detail herein.

To create a new request, the AF invokes a Nnef_IPTV_configuration service operation. The request contains the Multicast Access Control List, and a GPSI, or an External Group Id, DNN, S-NNSAI, AF Transaction Id and may contain a DNN and/or a S-NNSAI. To update or remove an existing request, the AF invokes Nnef_IPTV_configuration_Update or Nnef_IPTV_configuration_Delete service operation providing the corresponding AF Transaction.

2. The AF sends its request to the NEF. The NEF ensures the necessary authorization control, including throttling of AF requests and mapping from the information provided by the AF into information needed by the 5GC.

3. (in the case of Nnef_IPTV_configuration_Create or Update): The NEF stores the AF request information in the UDR (Data Set=Application Data; Data Subset=IPTV_configuration, Data Key=AF Transaction Internal ID, S-NSSAI and DNN and/or SUPI/Internal-Group-Id).

(in the case of Nnef_IPTV_configuration_Delete): The NEF deletes the AF requirements in the UDR (Data Set=Application Data; Data Subset=IPTV_configuration, Data Key=AF Transaction Internal ID).

The NEF responds to the AF.

4. The PCF(s) that have subscribed to modifications of AF requests (Data Set=Application Data; Data Subset=IPTV_configuration, Data Key=SUPI/Internal-Group-Id) receive, a Nudr_DM_Notify notification of data change from the UDR.

5. The PCF determines if existing PDU Sessions are potentially impacted by the AF request. For each of these PDU Sessions, the PCF updates the SMF with corresponding new PCC rule(s) by invoking Npcf_SMPolicyControl_UpdateNotify service operation as described in steps 5 and 6 in TS 23.502.

In some embodiments, a Multicast Access Control list can be provided by the AF in the IPTV domain to the NEF. The Multicast Access Control List defines the access right status (e.g., fully allowed, preview allowed, not allowed) of each of the Multicast channels per subscriber identified by a GPSI.

With regard to policy and charging control rules for PDU Sessions, e.g., used to support Residential Gateways (RGs), a PCF may take a Multicast Access Control list as input to policy decision(s) in cases where the PDU Session is used for IPTV service. In some embodiments, the PCC rules may be sent to SMF and may indicate allowed IP Multicast Addressing information. In some embodiments, a "gate status" may or may not be applicable to IGMP messages transmitted over PDU Sessions used for IPTV Service.

In some embodiments, a Policy Control Request Trigger (PCRT) relevant for SMF may be used to ask the SMF or another similar component of the 5G system to report to the PCF when some event has occurred and to allow the PCF to act upon this event by, for instance, providing new policies. In some embodiments, a PCRT may indicate when a user equipment joins or leaves a multicast group or multicast stream. In some embodiments, when the SMF reports this condition, it may indicate the corresponding IP Multicast Addressing information.

In some embodiments, a Packet Detection Rule (PDR) may be used to support PDU Sessions used for IPTV service.

In some embodiments, packets filter set may support Packet Filters fir IGMP, including both IGMPv2 and IGMPv3, specified respectively in IETF RFC 2236 and IETF RFC 3376, the entire contents of each of which are hereby incorporated herein by reference in their entireties for all purposes.

In some embodiments, for PDU Sessions used for IPTV service, following additional "action" values are used to support IPTV service. In some embodiments, an "action" indicating "IP Multicast Router Accept" may indicate whether to accept the multicast join and add the PDU Session to the requested multicast group distribution. In some embodiments, this may also imply acting as an IP Multicast Router. In some embodiments, an "action" indicating "IP Multicast Router Reject" may request to drop the IGMP join message. In some embodiments, when the UPF detects the IGMP leave message via the PDU Session, an "action" may indicate whether to ensure that the PDU Session is removed from the requested multicast group distribution.

In some embodiments, a Forwarding Action Rule (FAR) can be used to support PDU Sessions for RG. In some embodiments, for PDU Sessions used for IPTV Service, following additional "Action" values are used to support IPTV service. In some embodiments, an "action" comprising "IP Multicast Router Accept" may indicate whether to accept the multicast join and add the PDU Session to the requested multicast group distribution. In some embodiments, this may also imply acting as an IP Multicast Router. In some embodiments, an "action" comprising "IP Multicast Router Reject" may request to drop the IGMP join message. In some embodiments, when UPF detects the IGMP leave message via the PDU Session, an "action" may indicate whether to ensure that the PDU Session is removed from the requested multicast group distribution.

In some embodiments, a Usage Reporting Rule may be used to support PDU Sessions for RG. In some embodiments, for PDU Sessions used for IPTV service, a URR may indicate a Reporting Trigger with a value "IGMP notify" in which the UPF is to report to the SMF when it adds a PDU Session to the downlink (DL) replication tree associated with an IP Multicast flow or it removes a PDU Session from the DL replication tree associated with the IP Multicast flow. In some embodiments, the corresponding notification can or shall contain at least one of the Source IP of the DL multicast flow and the Destination IP address of the DL Multicast flow.

Referring now to FIG. 3, a policy control function (PCF) may send corresponding policy and charging control (PCC) rule(s), such as over the N7 interface, to the session management function (SMF) and/or the SMF sends N4 rules to the user plane function (UPF) over the N4 interface. In some embodiments, the user equipment, such as a Set Top box deployed in a customer's premises behind a Residential Gateway(s), can attempt to access an IP Multicast content by sending an IP Multicast Join request, such as defined in IETF RFC 3376 and/or IETF RFC 2236.

In some embodiments, a N4 Packet Detection Rule (PDR) may have already been defined to define Packets Filter Set support Packet Filters for Internet Group Management Protocol (IGMP), including both IGMPv2 signaling specified in IETF RFC 2236 and IGMPv3 signaling specified in IETF RFC 3376.

In some embodiments, a N4 Forwarding Action Rule (FAR) have already been defined to indicate whether to add the PDU Session to the requested multicast group or to drop the IGMP join message.

However, nothing has been defined, according to conventional systems and approaches, for the User Plane Function (UPF) to notify the Session Management Function (SMF) and for the SMF to notify the Policy Control Function (PCF) that a UE (a Residential Gateway) is joining (or is leaving) an IP Multicast distribution tree.

In some embodiments, over the N4 interface, update the definition Usage Reporting Rule (URR) as follows—URR used to support PDU Sessions for Residential Gateway (RG) follow the specifications in TS 23.501.

In some embodiments, for Protocol Data Unit (PDU) Sessions used for IPTV service, a Usage Reporting Rule (URR) may indicate a new Reporting Trigger (defined in TS 23.501) with a value "IGMP notify" where the User Plane Function (UPF) is to report to the Session Management Function (SMF) when it adds a PDU session to the downlink (DL) replication tree associated with an IP Multicast flow. In some embodiments, for Protocol Data Unit (PDU) Sessions used for IPTV service, a Usage Reporting Rule (URR) may indicate a new Reporting Trigger (defined in TS 23.501) with a value "IGMP notify" where the User Plane Function (UPF) is to report to the Session Management Function (SMF) when it removes a PDU session from the downlink (DL) replication tree associated with an IP Multicast flow.

In some embodiments, the corresponding notification shall contain the (Source IP of the DL multicast flow, Destination IP address of the DL multicast flow). In some embodiments, the URR may optionally include the IP Multicast Address(es) for which reporting is requested, e.g., for a specific IP Multicast Channel with Preview Allowed.

Referring now to FIGS. 4 and 5, possible apparatuses are schematically illustrated for carrying out the methods and processes disclosed herein. In some embodiments, the apparatus of an example embodiment includes, is associated with or is otherwise in communication with one or more of a processor 12, one or more of an associated memory 14 and one or more of a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 5 illustrates various components that may be utilized in a UE 700. The UE 700 includes a processor 702 that controls operation of the UE 700. The processor 702 may be embodied in a number of different ways. For example, the processor may be embodied as one or more of various hardware processing means such as a coprocessor, a microprocessor, a controller, a digital signal processor (DSP) 710, a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 702 may be configured to execute instructions stored in memory device 704 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The processor 702 (and/or co-processors or any other circuitry assisting or otherwise associated with the processor) may be in communication with memory 704 via a bus for passing information among components of the UE 700. The memory 704 may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory 704 may be configured to store information, data, content, applications, instructions, or the like for enabling the apparatus to carry out various functions in accordance with an example embodiment of the present disclosure. For example, the memory 704 could be configured to buffer input data for processing by the processor. Additionally or alternatively, the memory device could be configured to store instructions for execution by the processor.

The communication interface 706 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The UE 700 may also include a housing that contains one or more transmitters and one or more receivers to allow transmission and reception of data. The transmitter(s) and receiver(s) may be combined into one or more transceivers 708. One or more antennas 722 are attached to the housing and electrically coupled to the transceiver 708. The UE 700 may also include a digital signal processor (DSP) 710 for use in processing signals.

Referring now to FIGS. 6 and 7, illustrated are approaches for messaging and/or a notification protocol for sending, such as from the SMF to the UPF, a PFCP Session Establishment/Modification Request (e.g., a Create URR message), for example by using means such as the processor 702, such as through a radio access network (RAN) or the like. In some embodiments, means such as the processor 702, can be used to transmit or cause transmission of a PFCP Session Establishment/Modification Response, from the UPF to the SMF, such as in response to the UPF receiving the PFCP Session Establishment/Modification Request. In some embodiments, the SMF sends the PFCP Session Establishment/Modification Request to the UPF to request the UPF to report when a protocol data unit session has been added to or removed from a downlink replication tree associated with an internet protocol multicast flow.

Additionally or alternatively, the UE 700 receives, for example by using means such as the processor 702, a registration request message, an attach request message, a tracking area update request message, or the like. These messages can comprise information related to user equipment that connect to or disconnect from a IP multicast flow. As such, a session controller can send a request for reporting when a PDU Session is added to or removed from a downlink replication tree associated with an internet protocol multicast flow. In some embodiments, the processor 12, the processor 702, or the like can be used to identify PDU Sessions added to or removed from a downlink replication tree associated with an IP multicast flow. Likewise, the processor 12, the processor 702 and/or the like can be configured to, in response to receiving an indication related to whether a protocol data unit session has been added to or removed from the downlink replication tree added to or removed from the downlink replication tree associated with the IP multicast flow. In some embodiments, the processor 12, the processor 702, and/or the like can be configured to transmit a message related to the addition or removal of PDU Sessions to or from a downlink replication tree for an IP Multicast flow to a session management function.

In some embodiments, such as in FIG. 7, the UPF may indicate or otherwise determine that a user equipment joins or leaves an IP multicast flow and sends a PFCP Session Report Request to a SMF. In some embodiments, the SMF may then respond to the UPF with a PFCP Session Report Response.

Referring now to FIGS. 8-10, embodiments of methods are disclosed and illustrated as block flow diagrams. In particular, FIG. 8 illustrates a method 10 comprising receiving, from a session controller, a request for reporting when protocol data unit sessions are added to or removed from a downlink replication tree associated with an internet protocol multicast flow, at 11. In some embodiments, the method 10 can further comprise determining whether a protocol data unit session has been added to or removed from the downlink replication tree associated with the internet protocol multicast flow, at 12. In some embodiments, the method 10 can further comprise, in response to said determining, transmitting a message to a session management function indicative of that said protocol data unit session has been added to or removed from said downlink replication tree, at 13.

In some embodiments, such as illustrated in FIG. 9, a method 20 can comprise causing a user plane function to report when a protocol data unit session has been added to or removed from a downlink replication tree associated with an internet protocol multicast flow, at 21 or causing transmission of a request or command for a user plane function to report when a protocol data unit session has been added to or removed from a downlink replication tree associated with an internet protocol multicast flow, at 21'. In some embodiments, the method 20 can further comprise receiving, from the user plane function, a message indicative of that a protocol data unit session has been added to or removed from the downlink replication tree associated with the internet protocol multicast flow, said message comprising at least an internet protocol address associated with a multicast destination of said internet protocol multicast flow, at 22. In some embodiments, the method 20 can further comprise forwarding the indication that a protocol data unit session has been added to or removed from the downlink replication tree associated with the internet protocol multicast flow to entities that have been requested to be notified of such an event, at 23. In some embodiments, the method 20 can further comprise optionally, in response to receiving said message, determining from among a plurality of internet protocol multicast channels a particular internet protocol multicast channel to which a user equipment is listening, at 24.

In some embodiments, such as illustrated in FIG. 10, a method 30 can comprise receiving a message indicative of that a protocol data unit session has been added to or removed from a downlink replication tree associated with an internet protocol multicast flow, said message comprising at least an internet protocol address associated with a multicast destination of said internet protocol multicast flow, at 31. In some embodiments, the method 30 can further comprise in response to receiving said message, determining from among a plurality of internet protocol multicast channels a particular internet protocol multicast channel to which a user equipment is listening, at 32. In some embodiments, the particular IP multicast channel may support at least one of storing information related to said particular internet protocol multicast channel in order to generate billing information or statistical information, at 33, and/or controlling one or more times during which a user device may receive said internet protocol multicast flow, at 34.

As described above, FIGS. 3-10 are flowcharts of an apparatus 10/apparatus 700, method 10/method 20, method 30, and associated computer program products according to example embodiments of the disclosure. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present disclosure and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, from a session controller, a request for reporting when protocol data unit sessions are added to or removed from a downlink replication tree associated with an internet protocol multicast flow;
   determining whether a protocol data unit session has been added to or removed from the downlink replication tree associated with the internet protocol multicast flow; and
   in response to said determining, transmitting a message to a session management function indicating that said protocol data unit session has been added to or removed from said downlink replication tree,
   wherein said message comprises an internet protocol address associated with a multicast destination of said internet protocol multicast flow.

2. The method of claim 1, wherein said message comprises an internet protocol address associated with a source of said added or removed multicast flow and an internet protocol address associated with the multicast destination of said internet protocol multicast flow.

3. A method comprising:
   causing a user plane function to report when a protocol data unit session has been added to or removed from a downlink replication tree associated with an internet protocol multicast flow;
   receiving, from the user plane function, a message indicating that a protocol data unit session has been added to or removed from the downlink replication tree associated with the internet protocol multicast flow, said message comprising at least an internet protocol address associated with a multicast destination of said internet protocol multicast flow; and
   forwarding the indication that a protocol data unit session has been added to or removed from the downlink replication tree associated with the internet protocol multicast flow to entities that have requested to be notified in an instance in which a protocol data unit session has been added to or removed from the downlink replication tree associated with the internet protocol multicast flow.

4. The method of claim 3, wherein said causing comprises causing transmission, to the user plane function, of a request or command that the user plane function reports when a protocol data unit session has been added to or removed from the downlink replication tree associated with the internet protocol multicast flow.

5. The method of claim 3, wherein said causing is carried out according to usage reporting rules comprising information that defines how traffic arriving at the user plane function is to be measured and reported, and wherein said traffic is classified according to packet detection rules.

6. The method of claim 5, further comprising:
   determining whether said entities have requested to be notified in an instance in which a protocol data unit session has been added to or removed from the downlink replication tree associated with the internet protocol multicast flow.

7. The method of claim 3, further comprising:
   in response to receiving said message, determining, from among a plurality of internet protocol multicast channels, a particular internet protocol multicast channel to which a user equipment is listening.

8. An apparatus comprising at least one processor and at least one memory including computer program code for one or more programs, the at least one memory and the computer program code configured to, with the at least one processor, cause the apparatus at least to:
   receive, from a session controller, a request for reporting when protocol data unit sessions are added to or removed from a downlink replication tree associated with an internet protocol multicast flow;
   determine whether a protocol data unit session has been added to or removed from the downlink replication tree associated with the internet protocol multicast flow; and
   in response to said determining, transmit a message to a session management function indicate that said protocol data unit session has been added to or removed from said downlink replication tree,
   wherein said message comprises an internet protocol address associated with a multicast destination of said internet protocol multicast flow.

9. The apparatus of claim 8, wherein said message comprises an internet protocol address associated with a source of said added or removed multicast flow and an internet protocol address associated with the multicast destination of said internet protocol multicast flow.

10. An apparatus comprising at least one processor and at least one memory including computer program code for one or more programs, the at least one memory and the computer program code configured to, with the at least one processor, cause the apparatus at least to:
    cause a user plane function to report when a protocol data unit session has been added to or removed from a downlink replication tree associated with an internet protocol multicast flow;
    receive, from the user plane function, a message indicating that a protocol data unit session has been added to or removed from the downlink replication tree associated with the internet protocol multicast flow, said message comprising at least an internet protocol address associated with a multicast destination of said internet protocol multicast flow; and
    forward the indication that a protocol data unit session has been added to or removed from the downlink replication tree associated with the internet protocol multicast flow to entities that have been requested to be notified in an instance in which a protocol data unit session has been added to or removed from the downlink replication tree associated with the internet protocol multicast flow.

11. The apparatus of claim 10, wherein the at least one memory and the computer program code are configured to, with the at least one processor, cause the apparatus at least to:
    cause transmission, to the user plane function, of a request or command that the user plane function reports when a protocol data unit session has been added to or removed from the downlink replication tree associated with the internet protocol multicast flow.

12. The apparatus of claim 10, wherein said causing is carried out according to usage reporting rules comprising information that defines how traffic arriving at the user plane function is to be measured and reported, and wherein said traffic is classified according to packet detection rules.

13. The apparatus of claim 12, wherein the at least one memory and the computer program code are configured to, with the at least one processor, cause the apparatus at least to:

determine whether said entities have requested to be notified in an instance in which a protocol data unit session has been added to or removed from the downlink replication tree associated with the internet protocol multicast flow.

14. The apparatus of claim 10, wherein the at least one memory and the computer program code are configured to, with the at least one processor, cause the apparatus at least to:

in response to receiving said message, determine from among a plurality of internet protocol multicast channels a particular internet protocol multicast channel to which a user equipment is listening.

15. A computer program product comprising at least one non-transitory computer-readable storage medium having computer-executable program code instructions stored therein, the computer-executable program code instructions comprising program code instructions configured, upon execution, to:

receive, from a session controller, a request for reporting when protocol data unit sessions are added to or removed from a downlink replication tree associated with an internet protocol multicast flow;

determine whether a protocol data unit session has been added to or removed from the downlink replication tree associated with the internet protocol multicast flow; and in response to said determining, transmit a message to a session management function indicating that said protocol data unit session has been added to or removed from said downlink replication tree, wherein said message comprises an internet protocol address associated with a multicast destination of said internet protocol multicast flow.

16. The computer program product of claim 15, wherein said message comprises an internet protocol address associated with a source of said added or removed multicast flow and an internet protocol address associated with the multicast destination of said internet protocol multicast flow.

17. A computer program product comprising at least one non-transitory computer-readable storage medium having computer-executable program code instructions stored therein, the computer-executable program code instructions comprising program code instructions configured, upon execution, to:

cause a user plane function to report when a protocol data unit session has been added to or removed from a downlink replication tree associated with an internet protocol multicast flow;

receive, from the user plane function, a message indicating that a protocol data unit session has been added to or removed from the downlink replication tree associated with the internet protocol multicast flow, said message comprising at least an internet protocol address associated with a multicast destination of said internet protocol multicast flow; and forward the indication that a protocol data unit session has been added to or removed from the downlink replication tree associated with the internet protocol multicast flow to entities that have been requested to be notified of such an event.

18. The computer program product of claim 17, wherein the program code instructions are further configured, upon execution, to:

cause transmission, to the user plane function, of a request or command that the user plane function reports when a protocol data unit session has been added to or removed from the downlink replication tree associated with the internet protocol multicast flow.

19. The computer program product of claim 17, wherein said causing is carried out according to usage reporting rules comprising information that defines how traffic arriving at the user plane function is to be measured and reported, and wherein said traffic is classified according to packet detection rules, wherein the program code instructions are further configured, upon execution, to:

determine whether said entities have requested to be notified in an instance in which a protocol data unit session has been added to or removed from the downlink replication tree associated with the internet protocol multicast flow.

20. The computer program product of claim 17, wherein the program code instructions are further configured, upon execution, to:

in response to receiving said message, determine from among a plurality of internet protocol multicast channels a particular internet protocol multicast channel to which a user equipment is listening.

* * * * *